United States Patent
Klemen

(10) Patent No.: US 7,115,062 B2
(45) Date of Patent: Oct. 3, 2006

(54) MULTI-SPEED POWER TRANSMISSION

(75) Inventor: Donald Klemen, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 123 days.

(21) Appl. No.: 10/951,540

(22) Filed: Sep. 28, 2004

(65) Prior Publication Data

US 2006/0068967 A1    Mar. 30, 2006

(51) Int. Cl.
*F16H 3/92*    (2006.01)
(52) U.S. Cl. ........................................ 475/278; 475/330
(58) Field of Classification Search ................ 475/278, 475/284, 293, 311, 323, 330
See application file for complete search history.

(56) References Cited

U.S. PATENT DOCUMENTS

| | | | | |
|---|---|---|---|---|
| 4,985,011 A | * | 1/1991 | Asada et al. | 475/278 |
| 6,773,371 B1 | * | 8/2004 | Lee et al. | 475/296 |
| 7,014,589 B1 | * | 3/2006 | Stevenson | 475/284 |
| 7,018,318 B1 | * | 3/2006 | Klemen et al. | 475/275 |
| 2005/0054477 A1 | * | 3/2005 | Tiesler et al. | 475/284 |

* cited by examiner

*Primary Examiner*—Rodney H. Bonck
*Assistant Examiner*—Justin K. Holmes
(74) *Attorney, Agent, or Firm*—Christopher DeVries

(57) ABSTRACT

A powertrain incorporates an engine and a multi-speed transmission to provide at least six forward speed ratios and as many as eight forward speed ratios. The transmission incorporates three planetary gearsets and six torque-transmitting mechanisms for six speeds or seven speeds, and seven torque-transmitting mechanisms for eight speeds.

1 Claim, 3 Drawing Sheets

| RATIO SET 1 SEVEN CLUTCH SEVEN SPEED | | | | |
|---|---|---|---|---|
| Rev | -2.549 | | C470 | CREV78 |
| 1st | 3.195 | | C470 | C574 |
| 2nd | 2.219 | 1.44 | C166 | C574 |
| 3rd | 1.605 | 1.38 | C166 | C470 |
| 4th | 1.375 | 1.17 | C166 | C268 |
| 5th | 1.234 | 1.11 | C268 | C470 |
| 6th | 1.000 | 1.23 | C268 | C372 |
| 7th | 0.808 | 1.24 | C470 | C372 |
| 8th | 0.614 | 1.32 | C676 | C372 |

$$\frac{R36}{S34}=1.65 \qquad \frac{R46}{S44}=1.59 \qquad \frac{R56}{S54}=2.61$$

*FIG. 2*

MULTI-SPEED POWER TRANSMISSION

TECHNICAL FIELD

This invention relates to power transmissions and, more particularly, to power transmissions having six or more forward speed ratios.

BACKGROUND OF THE INVENTION

Passenger vehicles employ or incorporate a multi-speed power transmission of either the manual type, that is, countershaft, or the automatic type, that is, planetary. With the advent of the desire to improve performance and economy, the number of speeds available with these transmissions has increased from two in automatic transmissions, to five or more. In manual transmissions, the number of speeds has increased from three to six or more.

Also, with the desire for improved economy, manufacturers are considering lower-displacement high-speed engines, which will provide better fuel economy, maintain the performance, and reduce the engine size. The engines being considered are apt to reach speeds of 7000 to 8000 rpm at their maximum usable level. It will therefore be incumbent to provide transmissions which will satisfy the powertrain needs for these higher speed engines.

SUMMARY OF THE INVENTION

It is an object of the present invention to provide an improved multi-speed power transmission having six or more speeds to accommodate high-speed output engines.

In one aspect of the present invention, the transmission incorporates three planetary gearsets and seven torque-transmitting mechanisms to provide eight forward speed ratios.

In another aspect of the present invention, a transmission can employ six torque-transmitting mechanisms, three planetary gearsets, and provide six or seven forward speed ratios.

DESCRIPTION OF THE DRAWINGS

FIG. 2 is a chart showing the eight forward speed ratios and reverse speed ratio, as well as the steps between ratios and the torque-transmitting mechanism engagement schedule for use with the transmission shown in FIG. 1.

DESCRIPTION OF THE EXEMPLARY EMBODIMENTS

Figure 1:
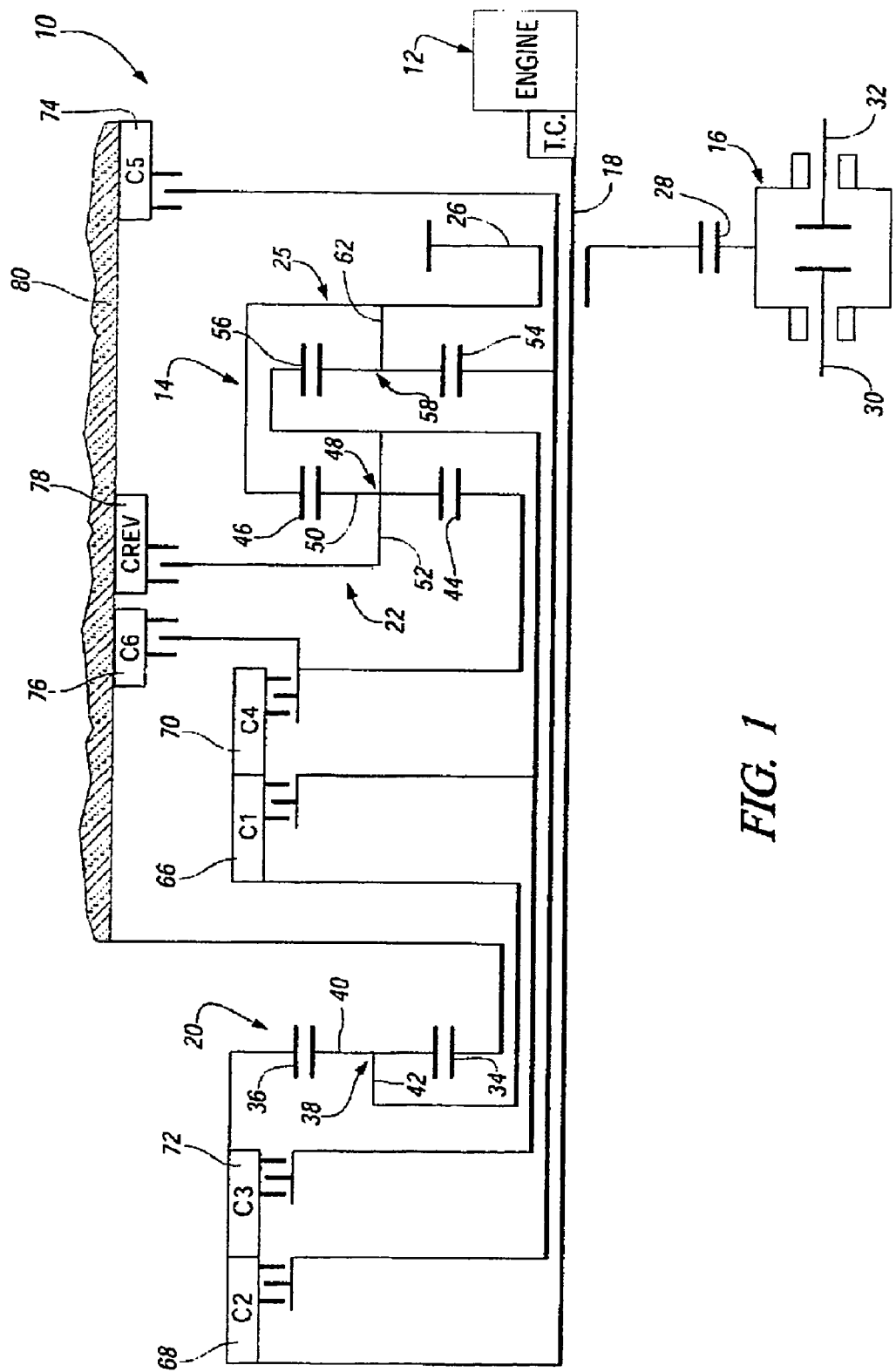
FIG. 1 is a schematic representation of a powertrain having a transmission incorporating one embodiment of the present invention.
Figure 3:
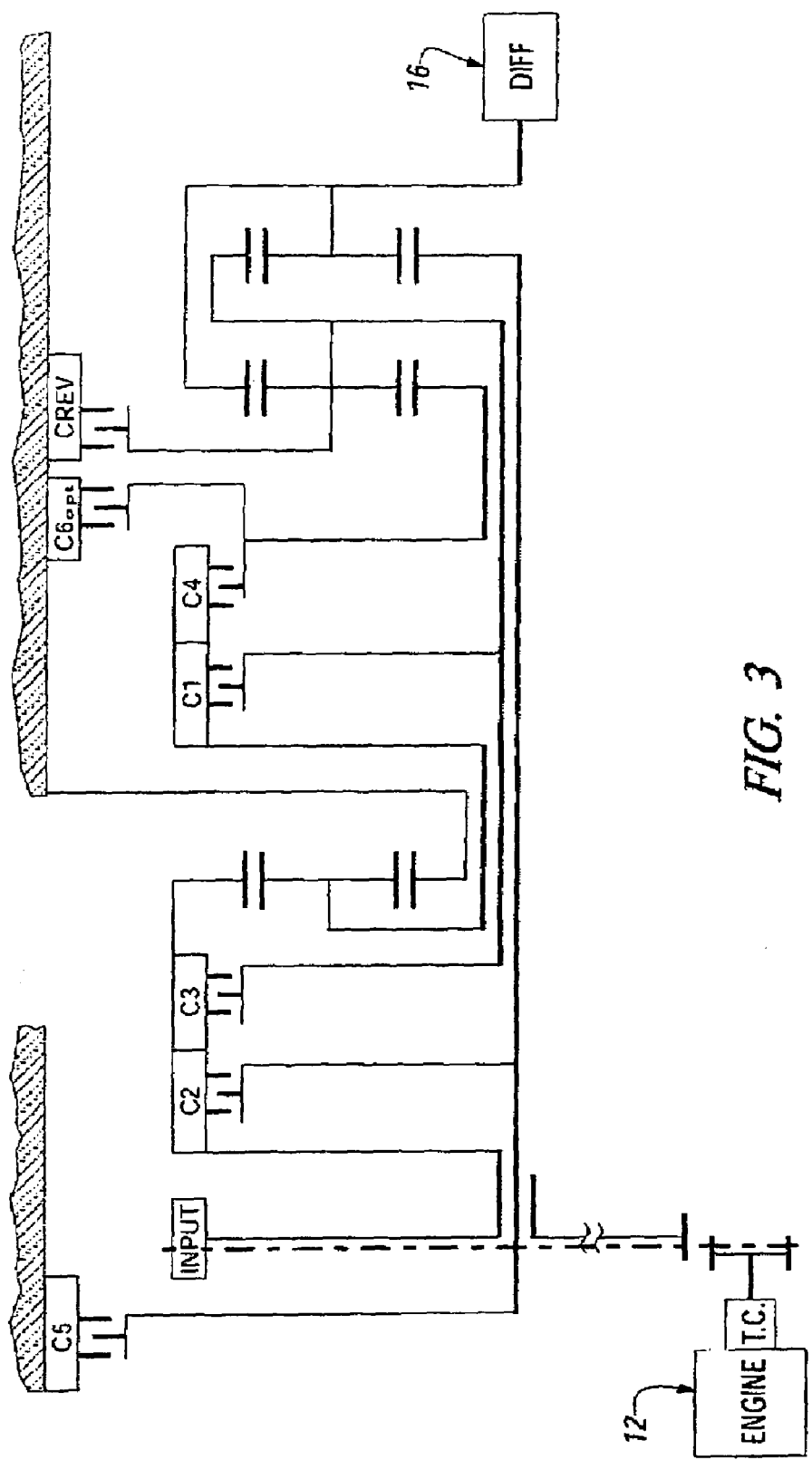
FIG. 3 is a schematic representation of another powertrain having a further embodiment of the present invention.

Referring to the drawings, wherein like characters represent the same or corresponding parts throughout the several views, there is seen in FIG. 1 a powertrain 10 having an engine 12, a planetary transmission 14, and a conventional differential output 16. The engine 12 is a conventional internal combustion mechanism, which might also have incorporated therewith a torque converter (TC), which drives a transmission input shaft 18.

The planetary transmission 14 has three planetary gearsets 20, 22, and 24 as well as an output gear or drive gear 26. The output gear 26 drivingly meshes with another output gear 28, which in turn drives the conventional differential 16. The differential 16 has two output members 30 and 32, which are connected with the drive wheels of the vehicle.

The planetary gearset 20 has a sun gear member 34, a ring gear member 36, and a planet carrier assembly member 38, which includes a plurality of pinion gears 40 rotatably mounted on a planet carrier member 42 and disposed in meshing relationship with both the sun gear member 34 and the ring gear member 36.

The planetary gearset 22 includes a sun gear member 44, a ring gear member 46, and a planet carrier assembly member 48. The planet carrier assembly member 48 has incorporated therein a plurality of pinion gears 50 rotatably disposed on a planet carrier member 52 and meshing with the sun gear member 44 and ring gear member 46.

The planetary gearset 24 includes a sun gear member 54, a ring gear member 56, and a planet carrier assembly member 58. The planet carrier assembly member 58 includes a plurality of pinion gears 60 rotatably mounted on a planet carrier member 62 and disposed in meshing relationship with both the sun gear member 54 and the ring gear member 56.

The transmission 14 also includes four rotating-type torque-transmitting mechanisms, or clutches, 66, 68, 70, and 72, and three stationary-type torque-transmitting mechanisms, commonly termed reaction clutches or brakes, 74, 76, and 78.

The ring gear member 36 is continuously connected with the input shaft 18, the planet carrier member 42 is continuously connected with the torque-transmitting mechanisms 66 and 70, and the sun gear member 34 is continuously connected with a transmission housing 80 or other stationary component within the transmission.

The input shaft 18 is also drivingly connected with the torque-transmitting mechanisms 68 and 72. The torque-transmitting mechanism 68 has one portion thereof continuously connected with the sun gear member 54 such that engagement thereof provides an input drive to the sun gear member 54. The torque-transmitting mechanism 72 is connected with the planet carrier member 52 and the ring gear member 56, such that engagement thereof provides drive from the input shaft 18 to the planet carrier member 52 and the ring gear member 56.

The torque-transmitting mechanism 66 is also connectable with the planet carrier member 52 and the ring gear member 56, such that engagement thereof provides a drive connection between the planet carrier member 42 and the planet carrier member 52 and the ring gear member 56. The torque-transmitting mechanism 70 is operatively connectable with the ring gear member 44, such that engagement thereof provides a drive connection between the planet carrier member 42 and the sun gear member 44.

The torque-transmitting mechanism 74 is operatively connectable between the housing 80 and the sun gear member 54, such that engagement thereof prevents rotation of the sun gear member 54. The torque-transmitting mechanism 76 is operatively connectable between the stationary portion 80 and the sun gear member 44, such that selective engagement thereof prevents rotation of the sun gear member 44. The torque-transmitting mechanism 78 is operatively connectable between the housing 80 and the planet carrier member 52 and the ring gear member 56, such that selective engagement thereof prevents rotation of the planet carrier member 52 and ring gear member 56.

The ring gear member 46 and planet carrier member 62 are continuously connected with the output gear 26, such that rotation of these members provides an output drive to the differential 16. The selective engagement of the torque-transmitting mechanisms 66, 68, 70, 72, 74, 76, and 78 in combinations of two, as shown in FIG. 2, will result in eight forward speed ratios and one reverse speed ratio being activated between the input shaft 18 and the differential 16.

To establish the reverse speed ratio, the torque-transmitting mechanisms 70 and 78 are engaged, such that the planet carrier member 42 connects with the sun gear member 44 and the planet carrier member 52 and ring gear member 56 are held stationary. The power flow is from the engine through the planetary gearset 20, which provides a reduction drive at the planet carrier member 42 to the sun gear member 44 and then through the planetary gearset 22, which provides a reverse mechanism and then to the output gear 26 and hence to the differential 16. As seen in FIG. 2, if the ring/sun ratios are as depicted, the reverse speed ratio will be a negative 2.549.

To establish the first forward speed ratio, the torque-transmitting mechanisms 70 and 74 are engaged. It should be noted that a ratio interchange from reverse to first forward only involves the swapping of the torque-transmitting mechanisms 78 and 74. During the first forward speed ratio, the reduced drive of the carrier 42 is directed through the torque-transmitting mechanism 70 to the sun gear member 44. The torque-transmitting mechanism 74 has been engaged, such that the sun gear member 54 is stationary. The planet carrier member 52 is driven forward by the action of the sun gear member 44 and a rotating reaction at the ring gear member 46. Thus, the ring gear member 56 rotates forwardly as does the carrier 62 resulting in a forward output at the drive gear 26 and therefore the differential 16. As seen in FIG. 2 the drive ratio established with the ring/sun ratios is 3.195.

To establish the second forward speed ratio, the torque-transmitting mechanisms 66 and 74 are engaged, and it should be noted that the ratio interchange from first-to-second is a singe transition shift wherein only the torque-transmitting mechanisms 70 and 66 are interchanged. During the second forward speed ratio, the reduced speed of the planet carrier member 42 is directed through the torque-transmitting mechanism 66 to the ring gear member 56. The sun gear member 54 is held stationary by the torque-transmitting mechanism 74 and therefore a reduction drive is presented at the carrier 62, which is transmitted to the differential 16. The second gear ratio, as shown in FIG. 2, is 2.219 and the step ratio between first and second is 1.44.

The third forward speed ratio is established with the engagement of the torque-transmitting mechanisms 66 and 70. Again, this is a single transition interchange with the swapping of the torque-transmitting mechanisms 74 and 70. During the third forward speed ratio, the planetary gearsets 22 and 24 are established as a 1:1 ratio with the engagement of the torque-transmitting mechanisms 66 and 70, such that a reduction ratio between the input shaft 18 and the differential 16 is established by the ratio of the planetary gearset 20. As seen in FIG. 2, this third gear ratio is 1.605 and the step ratio between second and third is 1.38.

The fourth forward speed ratio is established with the engagement of the torque-transmitting mechanisms 66 and 68. As with the other ratios described, this is a single transition interchange wherein only the torque-transmitting mechanisms 70 and 68 are interchanged. During the fourth forward speed ratio, the planet carrier member 42 is connected with the ring gear member 56 through the torque-transmitting mechanism 66 and the sun gear member 54 is driven by the input shaft 18 through the torque-transmitting mechanism 68. In the fourth forward speed ratio, two input speeds are imposed on the planetary gearset 24 resulting in a reduction drive having a ratio of 1.375 between the input shaft 18 and the differential 16. The 3–4 interchange is a single transition shift with only the swapping of the torque-transmitting mechanisms 70 and 68.

The swapping of the torque-transmitting mechanisms 70 and 66 resulting in the engagement of the torque-transmitting mechanisms 68 and 70 will establish the fifth forward speed ratio. During the fifth forward speed ratio, the sun gear member 44 is driven at the reduced speed of the planet carrier member 42 while the sun gear member 54 is driven at the speed of the input shaft 18. Rotation of the sun gear member 44 results in a reduced drive at the planet carrier member 52 and therefore the ring gear member 56. The combination of speeds of sun gear member 54 and ring gear member 56 results in an underdrive or reduced drive at the output gear 26 and therefore the differential 16. The fifth forward speed ratio provides a reduced ratio of 1.234 between the input shaft 18 and the differential 16. The step ratio between the fourth forward speed ratio and the fifth forward speed ratio is 1.11.

The sixth forward speed ratio is established with the engagement of the torque-transmitting mechanisms 68 and 72, both of which provide a drive between the input shaft 18 and the planetary gearsets 22 and 24 resulting in a 1:1 drive at the planetary gearsets and therefore a direct or 1:1 drive between the input shaft 18 and the differential 16. The step ratio between the fifth forward speed ratio and the sixth forward speed ratio is 1.23.

The seventh forward speed ratio is established with the engagement of the torque-transmitting mechanisms 70 and 72 and again a single transition shift is provided. During the seventh forward speed ratio, the torque-transmitting mechanisms 70 and 72 are engaged, such that the input shaft 18 is connected with the carrier 52 and the reduction drive of carrier 42 is connected with the sun gear member 44. Since both the carrier 52 and sun gear member 44 are driven forwardly, the ring gear member 46 receives an overdrive ratio, which is 0.808 as shown in FIG. 2. The sun gear member 44 being rotated forwardly imposes a negative or reverse ratio between the sun/ring; however, the drive at the carrier 52 is forward and provides an overdrive ratio, which is greater than the negative effect of the sun gear member 44. Thus, the overdrive ratio of 0.808 is provided between the input shaft 18 and the differential 16. A step ratio of 1.24 is established between the sixth and seventh forward speed ratios.

The eighth forward speed ratio is established with the engagement of the torque-transmitting mechanisms 72 and 76 and this also is a single transition interchange from the seventh ratio. During the eighth forward speed ratio, the torque-transmitting mechanism 76 holds the sun gear member 44 stationary and the planet carrier member 52 is driven forwardly by the input shaft 18. This provides an overdrive ratio at the planetary gearset 22, such that ring gear member 46 drives the output gear 26 at a speed faster than the input shaft 18 resulting in an overdrive ratio of 0.614 between the input shaft 18 and the differential 16. This 7–8 interchange has a step ratio of 1.32 and is also a single transition interchange.

The above ratios have been calculated between the input shaft 18 and the differential 16 and are set forth as if a 1:1 ratio exists between the gears 26 and 28. However, those skilled in the art will appreciate that this ratio can be established at essentially any number within reason whereby the ratios of the transmission depicted in FIG. 2 are multiplied by a final drive ratio and therefore may be established at higher or lower values than those shown. In most systems, the final drive ratio would be greater than one, thereby increasing the overall ratio between the input shaft 18 and the output members 30 and 32 of the differential 16.

It will be further noted that the torque-transmitting mechanism 76 is employed only in the eighth forward speed ratio, such that if seven forward speed ratios are desired, the torque-transmitting mechanism 76 may be eliminated. One further comment on these ratios is that the step ratio between fourth and fifth is 1.11 and, if desired, the fifth ratio might also be eliminated, which will result in a step ratio of 1.37 between the fourth ratio and the sixth ratio which would become the fifth ratio. Therefore, the elimination of the fifth ratio and the eighth ratio will result in a six-speed transmission, elimination of only the eighth ratio will result in a seven-speed transmission, and the inclusion of all the torque-transmitting mechanisms and their selective engagement will result in eight forward speed ratios and one reverse speed ratio. This arrangement therefore provides a planetary transmission that may be incorporated into a number of vehicles having both high-speed engines and more conventional speed ranges within the engine spectrum.

The invention claimed is:

1. A powertrain including a multi-speed transmission comprising:

an input shaft;

an output shaft;

three planetary gearsets each having first, second, and third members;

seven torque-transmitting mechanisms, which are selectively engaged in combinations of two to establish at least seven forward speed ratios between said input shaft and said output shaft;

said first member of said first planetary gearset being continuously connected with a ground member, said second member of said first planetary gearset being selectively connected with a first and second of said torque-transmitting mechanisms, and said third member of said first planetary gearset being selectively connectable with a third and fourth of the torque-transmitting mechanisms and also interconnected with said input shaft;

said first member of said second planetary gearset being selectively connectable with said second torque-transmitting mechanism;

said second member of said second planetary gearset being selectively connectable with a fifth of said torque-transmitting mechanisms and continuously connected with said first member of said third planetary gearset;

said third member of said second planetary gearset being continuously connected with said second member of said third planetary gearset and with the output of said transmission;

said third member of said third planetary gearset being selectively connectable with said fourth torque-transmitting mechanism and with said sixth torque-transmitting mechanism; and a seventh torque-transmitting mechanism selectively connectable between a transmission housing and said first member of said second planetary gearset and said fifth and sixth torque-transmitting mechanisms also being selectively connectable with said transmission housing.

* * * * *